US007089462B2

United States Patent
Floyd et al.

(10) Patent No.: US 7,089,462 B2
(45) Date of Patent: Aug. 8, 2006

(54) EARLY CLOCK FAULT DETECTION METHOD AND CIRCUIT FOR DETECTING CLOCK FAULTS IN A MULTIPROCESSING SYSTEM

(75) Inventors: Michael Stephen Floyd, Austin, TX (US); Kevin Franklin Reick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/418,499

(22) Filed: Apr. 17, 2003

(65) Prior Publication Data

US 2004/0221208 A1    Nov. 4, 2004

(51) Int. Cl.
    *G06F 11/00*    (2006.01)
    *G06F 11/30*    (2006.01)
(52) U.S. Cl. .................... 714/55; 714/47; 714/48; 713/500; 713/502
(58) Field of Classification Search ................ 714/55
    See application file for complete search history.

(56) References Cited

U.S. PATENT DOCUMENTS 5,581,699 A * 12/1996 Casal et al. ................... 714/55

\* cited by examiner

*Primary Examiner*—Scott Baderman
*Assistant Examiner*—Joseph Schell
(74) *Attorney, Agent, or Firm*—Mitch Harris, Atty at Law, LLC; Andrew M. Harris; Casimer K. Salys

(57) ABSTRACT

An early clock fault detection method and circuit for detecting clock faults in a multiprocessing system provides an error system that can be used to shutdown the multiprocessing system or a processor before errors caused by loss of synchronization between multiple processors can propagate from the processor causing storage or other systems to be corrupted. The detection circuit counts cycles of a high-frequency internal processor clock generated by multiplying an external master clock signal and detects whether or not a predetermined number of clock cycles have elapsed between transitions of the external master clock signal. The detection circuit provides a clock fault output within less than a master clock cycle, which can be used to shut down the processor, system or interconnect between processors, preventing loss or corruption of data before the high-frequency clock can drift enough to cause errors.

20 Claims, 4 Drawing Sheets

EARLY CLOCK FAULT DETECTION METHOD AND CIRCUIT FOR DETECTING CLOCK FAULTS IN A MULTIPROCESSING SYSTEM

BACKGROUND OF THE INVENTION

1. Technical Field

The present invention relates generally to processors and computing systems, and more particularly, to multiprocessing systems and a circuit for early clock fault detection.

2. Description of the Related Art

Present-day high-speed processors typically use a lower frequency external clock source or resonant circuit that operates a lower frequency than the high-speed internal clock used to clock internal processor states. The internal clocks of some present-day processors exceed 2 GHz in frequency and therefore would present problematic distribution phase problems and radiate excessive electromagnetic interference (EMI) if provided from outside an integrated circuit package. Therefore, present-day processors typically employ a phase-lock loop (PLL) multiplier circuit to generate the high-frequency internal clock from a lower frequency external clock.

In multiprocessing systems, where many processors are connected and intercommunicate, often in an array or cube arrangement, a lower frequency clock is distributed to provide synchronized clocking of multiple processors so that bus communication may be supported quasi-asynchronously (i.e., without handshaking or a local bus clock). While providing an interconnect advantage, a failure of a clock driver or a clock interconnect supplying one of the processors can corrupt data and disrupt synchronized program execution of an entire system.

What is most critical is avoiding corruption of data in such a system, as invalid results may be produced in a system where a clock distribution element fails or the master clock fails and those results may be written to permanent storage or otherwise communicated outside of the multiprocessing system. A single missing external clock cycle can destroy synchronization in such a system, causing errors that propagate to fixed storage or other systems.

U.S. Pat. No. 6,466,058 describes a clock fault detection scheme that reference measures one phase of the output of a digital phase detector using the VCO output of the PLL and the a reference clock to which the VCO is locked. The counters are reset in response to the other phase out of the phase detector and flag an error if either of the two counters overflow. While the above described scheme will generate an error if either clock fails for a predetermined amount of time, such a scheme is insufficient for detecting faults that will cause the above-described multiprocessors to lose synchronization and generate errors.

It is therefore desirable to provide an early clock fault detection that can detect failure of master clock distribution in a multiprocessing system. It would further be desirable to provide early clock fault detection that can detect failure of master clock distribution within less than a single cycle of the master clock.

SUMMARY OF THE INVENTION

The objective of providing early clock fault detection within less than a cycle of a master clock in a multiprocessing system is provided in a method, a processor and multiprocessing system including a clock fault detector.

The clock fault detector detects when the input master clock signal has failed by detecting edges of the input master clock signal using the high-frequency output of an internal high-frequency oscillator that is generated as a multiple of the input master clock prior to failure of the internal clock. The clock fault detector detects that a state change of the master clock signal has not occurred within a predetermined number of high-frequency oscillator cycles and can signal clock fault logic to take preventative action prior to the processor generating an error.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
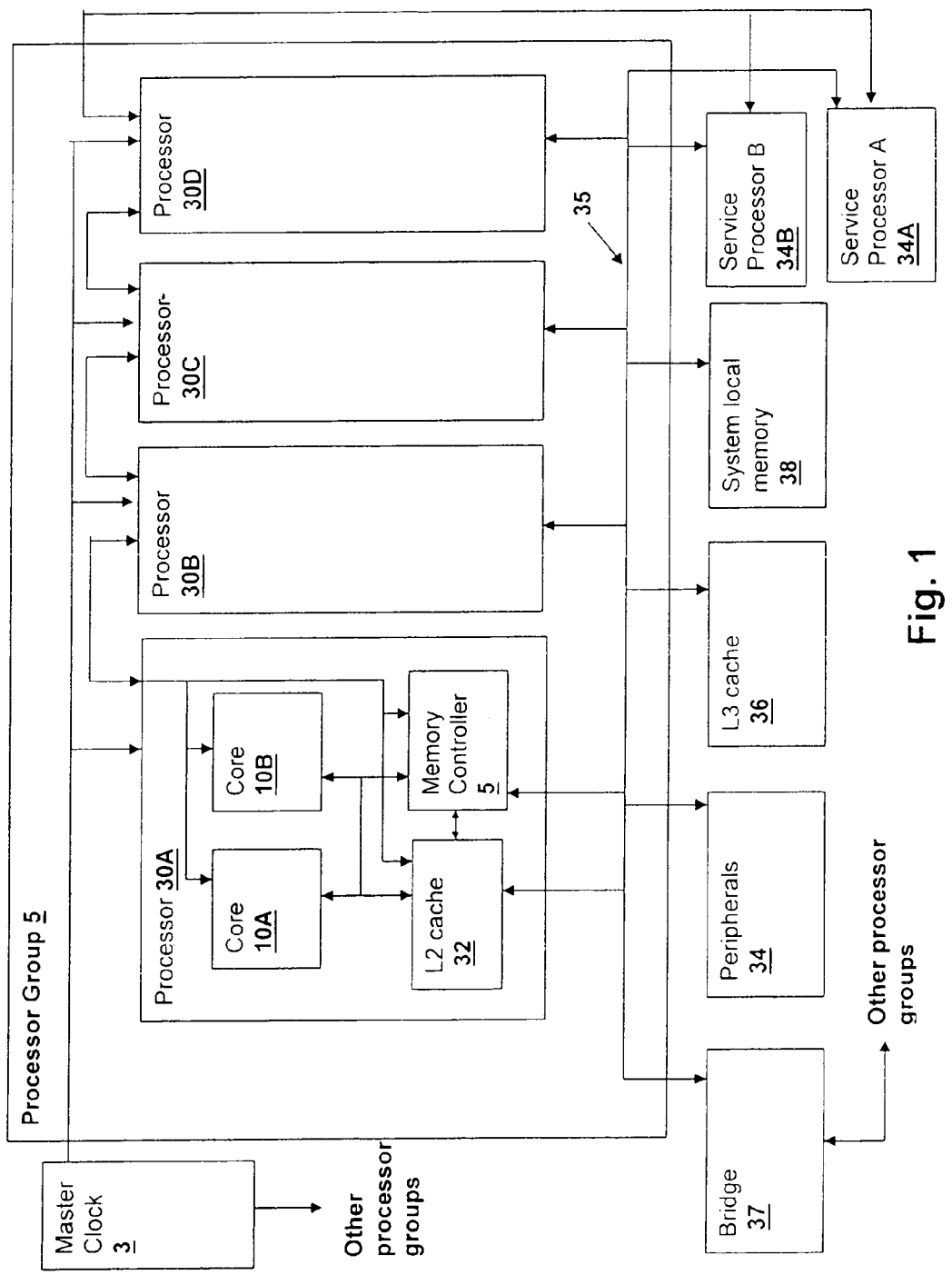
FIG. 1 is a block diagram of a multiprocessing system in accordance with an embodiment of the invention.

With reference now to the figures, and in particular with reference to FIG. 1, there is depicted a block diagram of a multiprocessing system in accordance with an embodiment of the present invention. The system includes a processor group 5 that may be connected to other processor groups via a bridge 37 forming a super-scalar processor. Processor group 5 is connected to an L3 cache unit 36 system local memory 38 and various peripherals 34, as well as to two service processors 34A and 34B. Service processors provide fault supervision, startup assistance and test capability to processor group 5 and may have their own interconnect paths to other processor groups as well as connecting all of processors 30A–D.

Within processor group 5 are a plurality of processors 30A–D, generally fabricated in a single unit and including a plurality of processor cores 10A and 10B coupled to an L2 cache 32 and a memory controller 4. Cores 10A and 10B provide instruction execution and operation on data values for general-purpose processing functions. Bridge 37, as well as other bridges within the system provide communication over wide buses with other processor groups and bus 35 provide connection of processors 30A–D, bridge 37, peripherals 34, L3 cache 36 and system local memory 38. Other global system memory may be coupled external to bridge 37 for symmetrical access by all processor groups. A master clock signal 3, generally in the 100 Mhz range is distributed to each of processors 30A–D, along with other processor groups.

Figure 2:
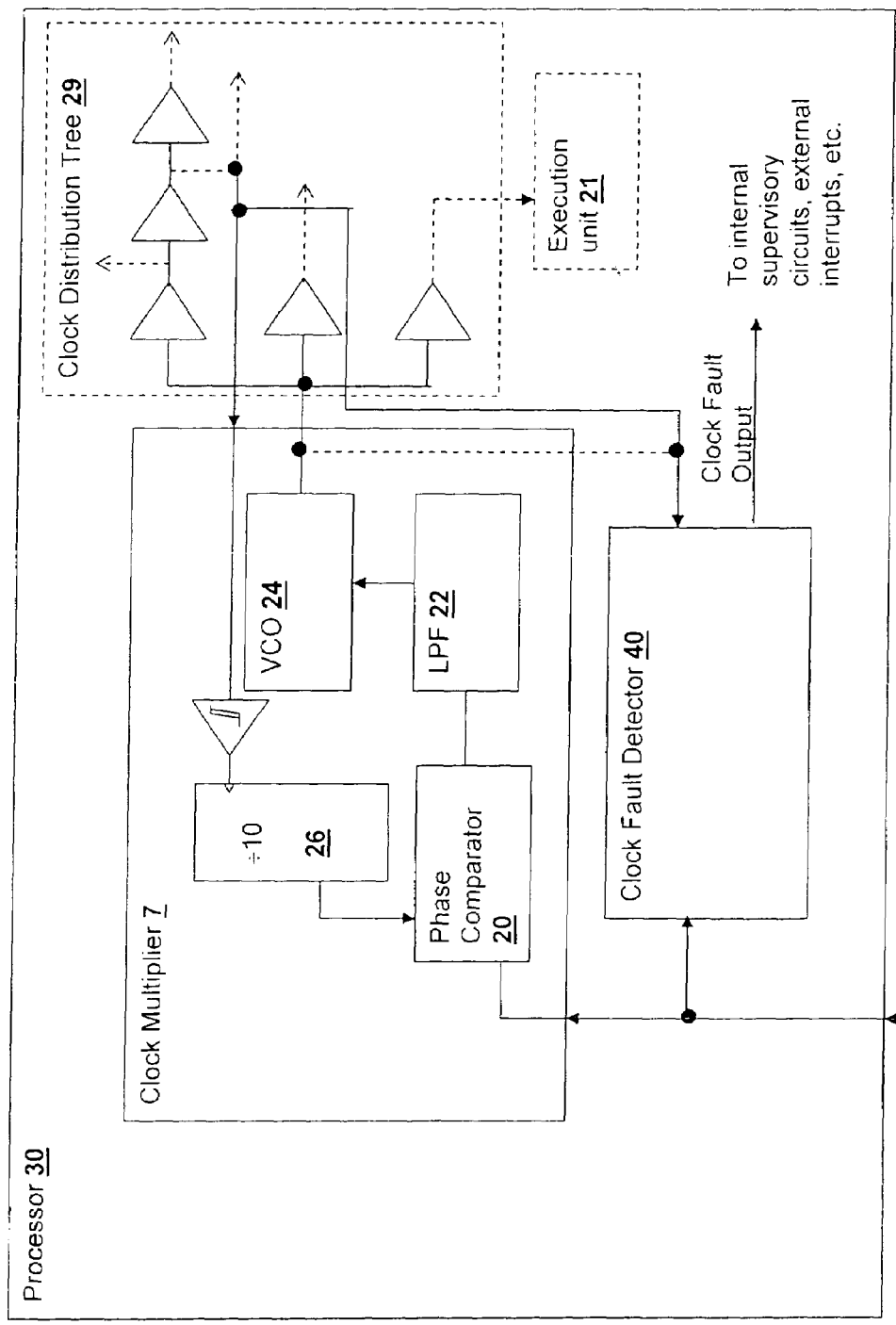
FIG. 2 is a block diagram of processor 5 of FIG. 1.

Referring now to FIG. 2, details of a processor 30 having features identical to processor cores 30A and 30B are shown.

Only details pertinent to the operation of the present invention are shown, which concerns the clock generation blocks and a novel clock fault detector circuit 40 that provides early indication of a clock fault. Clock multiplier 7 receives the master clock signal from master clock 3 of FIG. 1, and generates a high frequency output signal having a frequency 10 times the master clock frequency at the output of a voltage-controlled oscillator (VCO) 24. Phase comparator 20 and low pass filter (LPF) 22 provide for locking the phase of a signal divided by 10 from the high-frequency output signal by a counter 26, yielding a phase-lock loop (PLL) that generates the high frequency signal phase-locked to the master clock input. The PLL circuit is provided for illustration of a multiplier technique, and it should be understood that the techniques of the present invention may be used in conjunction with other multipliers, such as mixer multipliers, frequency-lock loops (FLLs) and other multiplier circuits.

A clock distribution tree 29 (or clock grid) comprises a plurality of buffers and transmission lines that provide clock signals to various internal blocks (e.g., exemplary execution unit 21) of processor 30, and each core 10A–B as well as other units within processor 30 will generally have its own clock distribution grid. Clock fault detector 40 is coupled to a point in clock distribution tree 29 for receiving a reference version of the high frequency signal (shown as the same point that enters counter 26, but may be connected to other points within clock distribution tree 29 or directly to the output of VCO 24). Clock fault detector 40 generates a clock fault output signal when a single clock fault on the master clock input signal is detected, indicating suspect behavior of master clock 3. The clock fault output signal is provided to control logic within processor 30 and may be provided on an external interrupt to service processors 34A–34B and may be provided directly to bridge 37. In response to clock fault output signal assertion, a variety of actions may be taken, including stopping processor 10, stopping the entire multiprocessing system (checkstop), and/or isolating processor group 5 from other processor groups. Service processors 34A–B can intercommunicate with service processors in other processor groups and are operated from an independent clock, so that if the master clock signal provided to processor group 5 fails, indications from other groups can help determine whether the failure is/was a master clock distribution failure or an overall failure of master clock 3.

Figure 3:
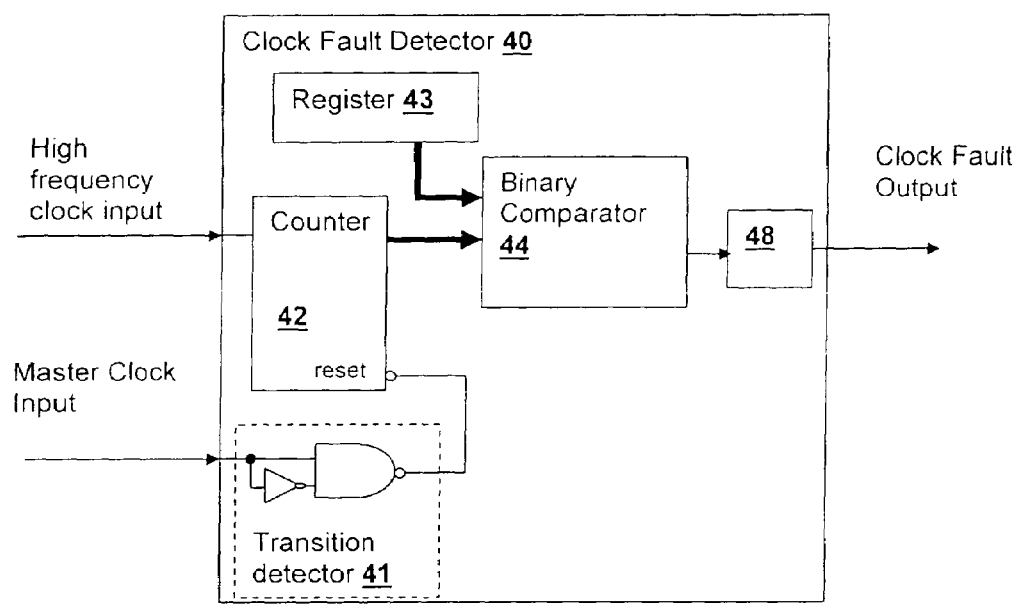
FIG. 3 is a block diagram of clock fault detector 30 within processor 5 of FIGS. 1 and 2.

Referring now to FIG. 3, details of clock fault detector 40 are shown. The high frequency clock input is provided to a counter 42 that counts cycles of the high frequency clock. Counter 42 is periodically reset by transitions of the master clock input signal. In the exemplary case, the transitions are positive transitions detected by a positive transition detector 41, but may be negative transitions or both master clock transitions. The output of counter 42 is received by a binary comparator 44 that generates an output signal to a latch cell 48 when the count output of counter 42 is equal to a value programmed in register 43. The output of latch cell 48 is used as the clock fault output to signal a remedial action such as a system shutdown. Clock fault detector 40 thus forms an early master clock fault detector, as the failure of an edge of master clock signal can be detected to within one clock cycle of the high frequency clock. The high frequency clock (generally due to the action of LPF 22 of FIG. 2) will continue to run in sufficient phase or frequency lock to a previously error-free master clock signal so that remedial action can be taken before errors occur. Due to the nature of the PLL operation, several VCO 24 output high-frequency cycles will be produced within the tolerable window of synchronization with the previously failure-free master clock signal before the processor will drift out of sync with other synchronized processors and system blocks. Thus there is a window of several VCO output 24 cycles before an error or data corruption occur.

Figure 4:
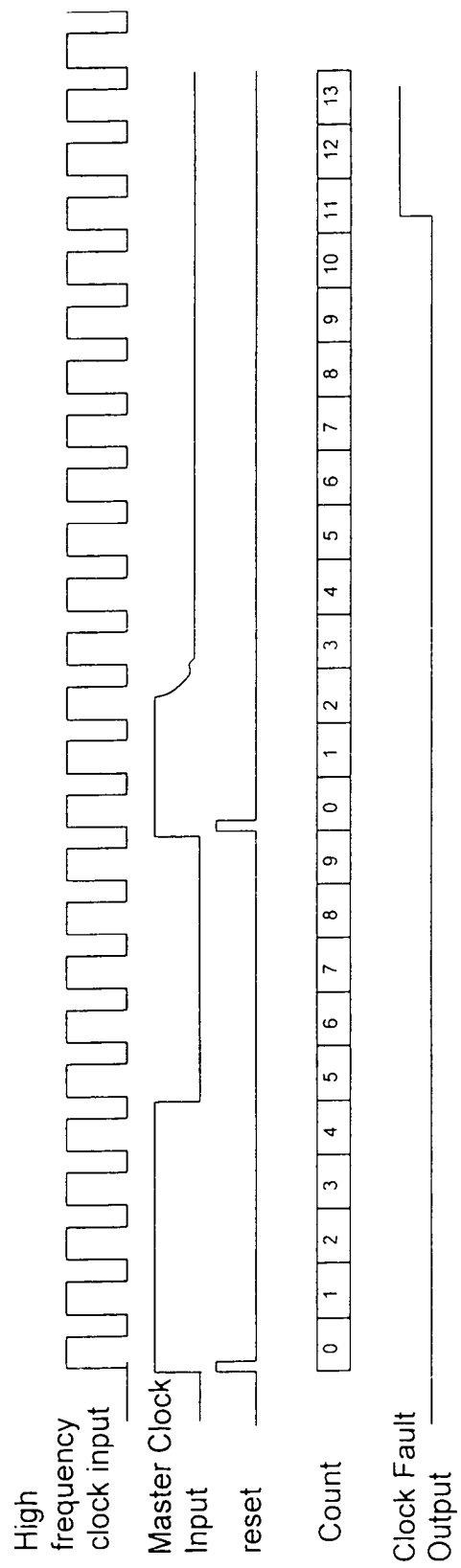
FIG. 4 is a timing diagram showing signals within fault detector 30 of FIG. 3.

Referring now to FIG. 4, signals within clock fault detector 40 are shown in a timing diagram. Each positive transition of the master clock input signal results in a positive pulse on the reset input to counter 42, which resets the count value to zero. Shown is one complete good cycle of master clock, followed by an exemplary clock fault where the master clock input ceases to transition. (Note—in accordance with the present invention, a master clock fault is detected for even a single missing/sufficiently delayed transition.) After the fault, count continues to increase until it reaches a value of 11, which by example is the value set in register 43 and the clock fault output is asserted. A value of 11 is chosen to provide a buffer zone of one high frequency clock cycle to provide for jitter and metastability in the clocking circuits, preventing false alarms. As an alternative, a value of 6 could be chosen for a clock fault detector that resets counter 42 on both transitions of the master clock, which would again supply a one-cycle buffer against false alarms.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of detecting a clock fault in a master clock signal delivered to a processor, comprising:
   receiving a master clock signal;
   multiplying said master clock signal by a predetermined multiplier to produce a high frequency clock output;
   counting cycles of said high frequency clock output;
   determining whether or not said master clock signal has transitioned prior to said counting reaching a predetermined cycle count value of said high frequency output; and
   in response to determining that said master clock signal has not transitioned, generating a clock fault output signal.

2. The method of claim 1, further comprising selecting said predetermined cycle count value, whereby variation between said high frequency clock output and said master clock signal is compensated for to avoid generating false alarms.

3. The method of claim 1, wherein said determining whether or not said master clock signal has transitioned is performed by resetting a cycle counter in response to transitions of said master clock signal and comparing an output of said cycle counter to said predetermined cycle count value to produce said clock fault output signal, whereby said clock fault output signal is asserted if said cycle counter reaches said predetermined cycle count value between transitions of said master clock signal.

4. The method of claim 1, wherein said predetermined cycle count value is equal to said predetermined multiplier plus one.

5. The method of claim 1, wherein said predetermined cycle count value is equal to said predetermined multiplier divided by two plus one.

6. The method of claim 1, further comprising distributing said high frequency clock output through a clock distribution grid, and wherein said counting counts cycles of a signal returned from a point in said grid remote from said high frequency clock output.

7. A processor comprising:
a master clock input for receiving a master clock signal;
a frequency multiplier coupled to said master clock input for producing a high frequency clock output having a first frequency that is a multiple of a frequency of said master clock signal; and
a clock fault detection circuit having a first input coupled to said high frequency clock output and a second input coupled to said master clock input, wherein said clock fault detection circuit includes a counter for counting a number of cycles of said high frequency clock output, and a logic circuit for determining whether or not said master clock input has transitioned within a predetermined number of cycles less than a full cycle of said master clock signal, and wherein said logic circuit produces a clock fault output in response to determining that said master clock input has not transitioned within said predetermined number of cycles.

8. The processor of claim 7, wherein said logic circuit comprises:
a register for receiving a programmed value corresponding to said predetermined number of cycles;
a binary comparator coupled to an output of said counter and further coupled to said register and having an output coupled to said clock fault output, whereby said comparator generates said clock fault output if said counter reaches said predetermined number of cycles.

9. The processor of claim 7, wherein said counter includes a reset input responsive to edge transitions of a reset input signal and wherein said reset input signal is coupled to said master clock signal, whereby said counter is reset in response to said transitions.

10. The processor of claim 7, wherein said predetermined number of cycles is equal to a value by which said frequency multiplier multiplies said master clock signal plus one.

11. The processor of claim 7, wherein said predetermined number of cycles is equal to half of a value by which said frequency multiplier multiplies said master clock signal plus one.

12. The processor of claim 7, further comprising a clock distribution grid coupled to said high frequency clock output, and wherein said counter has a clock input coupled to a signal returned from a point in said grid remote from said high frequency clock output.

13. The processor of claim 7, wherein said multiplier is a phase-lock loop, whereby said high frequency clock is generated in fixed phase relation with said master clock signal.

14. A multiprocessing system comprising:
a master clock unit for producing a master clock signal;
a plurality of processors coupled to said master clock signal and interconnected by one or more buses, and wherein at least one of said plurality of processors includes a clock fault detection circuit having a first input coupled to an internal high frequency clock output coupled to internal processing units of said at least one processor and a second input coupled to said master clock signal, wherein said clock fault detection circuit includes a counter for counting a number of cycles of said high frequency clock output, and a logic circuit for determining whether or not said master clock input has transitioned within a predetermined number of cycles less than a full cycle of said master clock signal, and wherein said logic circuit produces a clock fault output in response to determining that said master clock input has not transitioned within said predetermined number of cycles.

15. The multiprocessing system of claim 14, wherein said clock fault output is coupled to an isolation circuit, whereby said at least one processor is isolated from other processors of said plurality of processors in response to said clock fault output indicating that a clock fault has occurred.

16. The multiprocessing system of claim 14, wherein said clock fault output is coupled to an isolation circuit, whereby said plurality of processors are isolated in response to said clock fault output indicating that a clock fault has occurred.

17. The multiprocessing system of claim 14, wherein said clock fault output is coupled to a processor control circuit, whereby said at least one processor is halted in response to said clock fault output indicating that a clock fault has occurred.

18. The multiprocessing system of claim 14, wherein said clock fault output is coupled to a processor control circuit, whereby said at least one processor is halted in response to said clock fault output indicating that a clock fault has occurred.

19. The multiprocessing system of claim 14, wherein said logic circuit comprises:
a register for receiving a programmed value corresponding to said predetermined number of cycles; and
a binary comparator coupled to an output of said counter and further coupled to said register and having an output coupled to said clock fault output, whereby said comparator generates said clock fault output if said counter reaches said predetermined number of cycles.

20. The multiprocessing system of claim 19, wherein said counter includes a reset input responsive to edge transitions of a reset input signal and wherein said reset input signal is coupled to said master clock signal, whereby said counter is reset in response to said transitions.

* * * * *